April 4, 1961 A. L. OLSON 2,977,926
FLUID COATING APPARATUS
Filed April 29, 1958 3 Sheets-Sheet 1
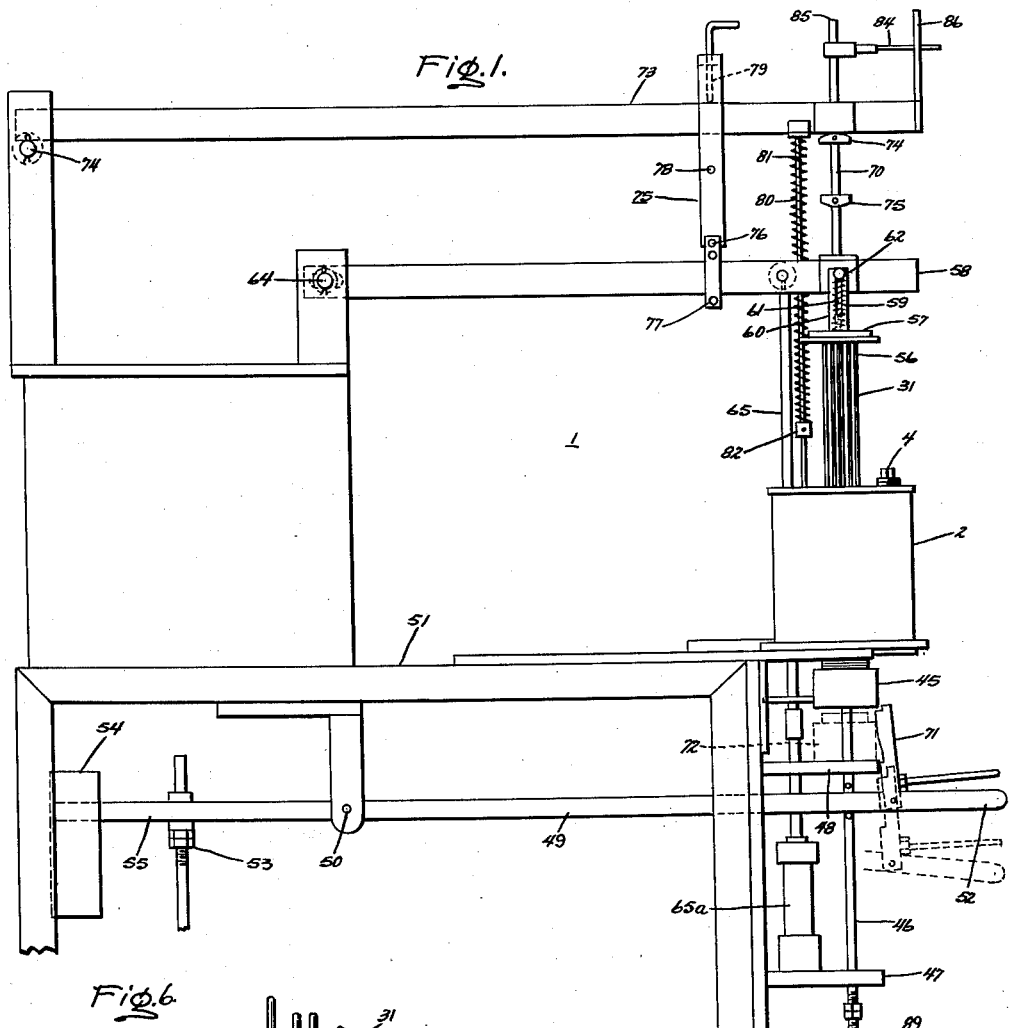
Fig. 1.
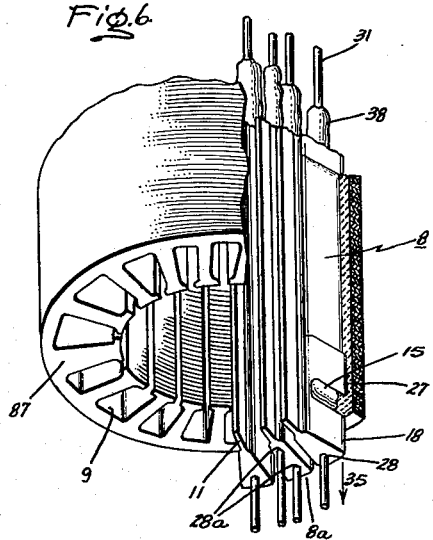
Fig. 6.
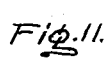
Fig. 11.
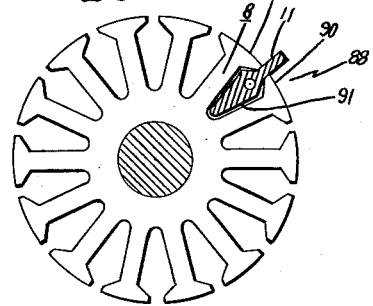
Inventor:
Albert L. Olson,
by H. F. Manbeck, Jr.
Attorney.

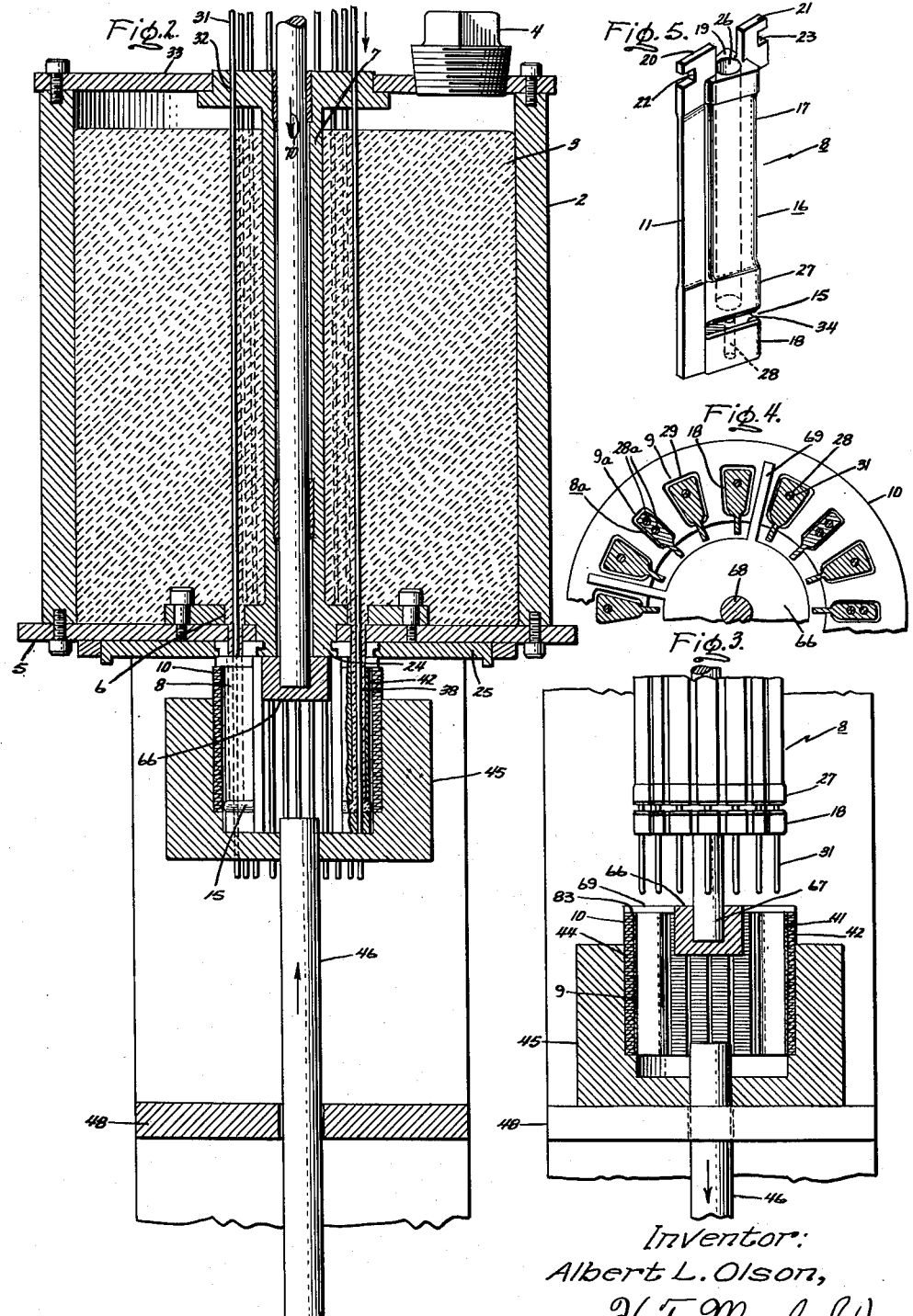

April 4, 1961 A. L. OLSON 2,977,926
FLUID COATING APPARATUS
Filed April 29, 1958 3 Sheets-Sheet 3

Inventor:
Albert L. Olson,
by H. F. Manbeck, Jr
Attorney.

United States Patent Office 2,977,926
Patented Apr. 4, 1961

2,977,926

FLUID COATING APPARATUS

Albert L. Olson, Fort Wayne, Ind., assignor to General Electric Company, a corporation of New York Filed Apr. 29, 1958, Ser. No. 731,697

16 Claims. (Cl. 118—105)

This invention generally relates to methods and apparatus for applying a fluid coating on a surface of a solid article and more particularly to apparatus for applying an integral insulating coating on the walls of winding slots of dynamoelectric machine core members.

Dynamoelectric machines, i.e., motors and generators, conventionally include a stator core member and a rotor core member concentrically disposed within the stator member and defining an air gap therewith, at least one and frequently both of the members having a plurality of winding slots formed therein; in the case of the stator member, the winding slots conventionally extend radially outward from the bore whereas in the case of the rotor member, the winding slots conventionally extend radially inward from the outer periphery. These core members are conventionally formed of a plurality of relatively thin laminations punched from magnetic steel and thus the winding slots generally have burrs or other sharp edges thereon. Dynamoelectric machines in the smaller frame sizes conventionally have their windings, which are positioned in the winding slots, formed of enameled magnet wire, and thus, if such windings were merely positioned in the slots without other insulation, the burrs and other sharp edges would tend to cause breaks in the enameled insulation on the wire and thus short circuits to ground. For this reason, it has been conventional to employ separate insulators for the winding slots of dynamoelectric machine core members, such insulators being formed of such materials as kraft paper, cellulose acetate, or the newer plastic films; these prior individual slot insulators were conventionally formed with cuff portions at the opposite ends of the slot in order to prevent the portion of the winding which extends beyond the slot, i.e., the end turns, from being shorted to the core at the exterior corners of the slot. In addition, it is conventional to provide separate insulators at each end of the core. Such individual slot and end insulators have been in themselves expensive and their installation has added appreciably to the overall cost of the machines. Further, in spite of careful installation of such slot and end insulators and winding of the wire into the slots, short circuits to ground due to abrasion of the enameled wire have continued.

To obviate these difficulties incurred with the common slot and end insulators, there have in the past been many proposals to apply an integral coating or layer of insulation material to the walls of dynamoelectric machine core member winding slots and also to the exterior corners of the slots and the ends of the core, and many methods of applying such insulation such as dipping, spraying, etc. have been tried. In U.S. patent application Serial No. 775,260, filed November 20, 1958, by Nick Baciu and assigned to the same assignee as the present invention, there is disclosed and claimed an improved fluid drawing process for applying a coating in slots and ends of core members. It would be very desirable if apparatus utilizing the improved fluid drawing process of Baciu were provided for applying such a fluid insulating coating, preferably in a viscous state, to a surface of a solid article, such as the walls of dynamoelectric machine core member slots, such apparatus being capable of employment in quantity production. It is of course desirable that such apparatus simultaneously apply the insulation material to all of the winding slots of the dynamoelectric machine core member, that the machine be relatively simple, and that it be capable of operation by relatively unskilled individuals.

It is therefore an object of this invention to provide improved apparatus for applying a fluid coating on the surface of a solid article.

Another object of this invention is to provide improved apparatus for applying integral insulation to the walls of dynamoelectric machine core member winding slots.

A further object of this invention is to provide improved apparatus for simultaneously applying integral insulation to the walls of all of the winding slots of a dynamoelectric machine core member.

A still further object of this invention is to provide improved apparatus for applying integral insulation to the walls of dynamoelectric machine core member winding slots and having the desirable features set forth above.

In carrying out my invention in one form thereof, I provide a coating apparatus which is especially suited for applying an insulating coating to the slots of a dynamoelectric machine core member. This apparatus includes at least one applicator which is adapted to be inserted into the slots of the core member. The applicator is provided with distributing head having a predetermined clearance from the surfaces of the slot accommodating the applicator, and during the operation of the apparatus viscous coating material is introduced into the slot adjacent the distributing head. As the coating material is introduced, relative movement is effected between the applicator and the core member and as a result of this movement the distributing head spreads the coating material over the surfaces of the slot in an even layer.

By a further aspect of my invention the apparatus is provided with improved means for supplying the coating material to the distributing head of the applicator. These means include a receptacle for the material, which has a discharge opening therein. The applicator itself is provided with an opening or passageway in alignment with the receptacle opening and extending through the length of the applicator. An elongated rod member is provided adapted to be moved through the openings, the receptacle and applying member openings being larger than the rod member. Means are provided for moving the rod member through the receptacle and the openings, a coating or layer of the fluid coating material thereby adhering to the rod member and being carried through the openings. The applicator has rod wiping means formed thereon so that relative movement of the applicator and the rod member causes removal of the fluid layer therefrom. The coating material so removed is fed into the slot of the core member and spread therealong by the distributing head of the applicator.

In the preferred embodiment of my invention for applying integral insulation on the walls of a dynamoelectric machine core member winding slot, an elongated fluid applicator is provided which is especially adapted to be inserted in the winding slot, the applicator having a transverse slot formed therein defining first and second body portions. The first body portion of the applicator is secured to the fluid receptacle and has at least a part thereof proportioned substantially to fill the winding slot, whereas the second body portion or distributing head is proportioned to provide a clearance with the winding slot wall. The first body portion has a longitudinally extending opening formed therethrough communicating with the receptacle opening and the transverse slot and the second body portion likewise has a longitudinal opening formed therethrough communicating with the transverse slot and in alignment with the first body portion opening. The receptacle and first body portion openings provide a substantial clearance around the rod member, whereas the second body portion opening is arranged to provide a close slip fit with the rod member so that axial movement of the rod member through the second body portion opening causes the fluid insulation coating thereon to be wiped from the rod member and thereby to flow out of the transverse slot. A member is arranged normally to support the core member with the applicator in the winding slot and means are provided to move the supporting member away from the receptacle, thereby to move the applicator out of the slot so that the fluid insulation material which flows out of the transverse slot in the applicator is applied to the wall in the winding slot in the core member by the second body portion of the applicator by a more or less spreading action.

Further objects and advantages of my invention will become apparent by reference to the following description and the accompanying drawings, and the features of novelty which characterize my invention will be pointed out with particularity in the claims annexed to and forming a part of the specification.

In the drawings,

Fig. 1 is a side-elevational view of apparatus incorporating my invention for applying integral insulation to the winding slots of a dynamoelectric machine core member.

Fig. 2 is a fragmentary cross-sectional view of a portion of the apparatus of Fig. 1 with the operative elements shown in one position;

Fig. 3 is another fragmentary view partly in section, showing the operative elements of Fig. 2 in another position;

Fig. 4 is a fragmentary view, partly in section, further illustrating the apparatus of Figs. 1, 2 and 3, and its mode of operation;

Fig. 5 is a view in perspective of the insulation applying members of the apparatus of the previous figures;

Fig. 6 is a view in perspective, partly broken away, showing the positioning of the applying members in the slots of a dynamoelectric machine stator member and further showing the mode of operation of the apparatus;

Fig. 11 shows a dynamoelectric machine rotor member to which integral insulation may be equally advantageously employed by the improved apparatus of my invention.

Figure 7:
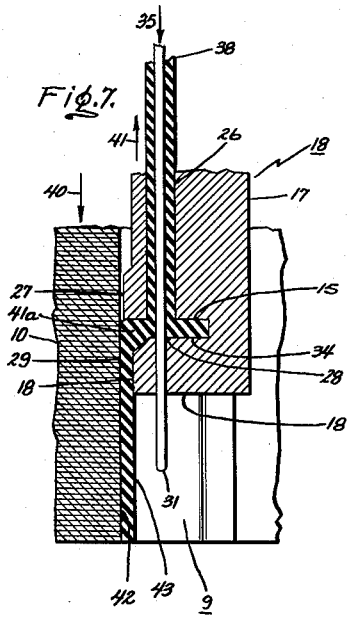
Fig. 7 is a fragmentary cross-sectional view further showing the applying members of my improved apparatus and their mode of operation in applying the integral insulation to the walls of the winding slots.

Referring now to Fig. 1, my improved apparatus, generally identified as 1, includes a receptacle 2 in which the insulation or coating material 3 is retained. The coating material 3, which may for example be a heat hardenable epoxy resin, is preferably in somewhat viscous fluid form, i.e., in a state of plasticity, and is introduced into the receptacle 2 through a suitable filling plug 4.

The bottom wall 5 of receptacle 2 has a plurality of circularly arranged openings 6 formed therethrough and also has a vertically arranged centrally disposed passageway 7 coaxially arranged within the circle of opening 6, both for a purpose to be hereinafter described.

A plurality of fluid applying members or applicators 8 are provided corresponding in number to the number of winding slots in the core member to be insulated. Each insulation applying member 8 is adapted to be positioned in a respective winding slot 9 in a dynamoelectric machine stator member 10, being sufficiently elongated so as to extend substantially through the slot and having a narrow portion 11 extending out of the slots between the respective pole tips 12 and 13 into the bore of the stator member 10 (Figs. 6 and 11).

As is best shown in Fig. 5, each fluid applying member or applicator 8 has a transverse slot 15 formed in its surface 16 remote from the narrow portion 11, the slot 15 defining a first relatively elongated body portion 17 and a second relatively short body portion or distributing head 18. The upper end 19 of the first body portion 17 of fluid insulation applying members 8 are respectively secured to the bottom wall 5 of the fluid insulation receptacle 2; in the specific embodiment shown, ends 19 of the fluid applying members 8 are provided with a pair of oppositely disposed projections 20 and 21 respectively having notches 22 and 23 formed therein. The inner notches 22 are seated in an annular flange portion 24 at the base of the vertical passageway 7 of the receptacle 2 and the applying members 8 are held in their desired circular relationship against the annular flange 24 by means of suitable keys 25 which engage the outer slots 23.

Each of the fluid applying members 8 has an opening 26 longitudinally extending through its first body portion 17, and communicating with the transverse slot 15 and another longitudinal opening 28 extending through the second body portion 18 and likewise communicating with the transverse slot 15. The longitudinal openings 26 in the first body portion 17 of the fluid applying members 8 communicate and are in alignment with the openings 6 in the bottom wall 5 of the receptacle 2 and the opening 28 in the second body portions 18 are in axial alignment with the openings 26 and 6. The first body portions 17 of the fluid applying members 8 have a portion 27 immediately adjacent the transverse slot 15 which substantially completely fills the respective winding slot 9, merely providing a slip clearance with the walls of the slot, whereas the second body portion or distributing head 18 is proportioned so as to provide a predetermined larger clearance 29 with the walls of the respective winding slot, this larger clearance corresponding to the desired thickness of the insulation coating to be applied to the wall of the slot.

A plurality of elongated rod members 31 are provided of sufficient length to extend completely through the receptacle 2 and the openings 26 and 28 in the fluid applying members 8. The rod members 31 extend through suitable openings 32 in the top wall 33 of receptacle 2, as shown, and likewise are adapted to extend through openings 6 in the bottom wall 5, openings 26 in the first body portion 17 and 28 in the second body portion 18 of the fluid applying members 8. As will become apparent immediately hereafter, the openings 6 and 26 respectively provide a substantial clearance around the elongated rod members 31 whereas the longitudinal openings 28 in the second body portions 18 respectively provide a close slip fit with the rod members 31. Referring momentarily particularly to Fig. 4, it will be seen that the majority of the fluid applying members 8 are provided with a single set of the aligned openings 26 and 28, however, in the case of the fluid applying members 8a adapted to be positioned in certain narrow slots 9a, two or even more sets of openings 26a and 28a are provided with elongated rod members 31 respectively corresponding thereto.

In the operation of the apparatus thus far described, the elongated rod members 31 are moved downwardly through the viscous fluid insulating material 3 in the receptacle 2 and through openings 6 in the bottom wall 5 thereof into longitudinal openings 26 in the first body portion 17 of the fluid applying members 8. The viscous fluid insulating material 3 thus forms a coating on the rod members 31 by surface tension, this coating being carried by the rod members through the openings 6 and 26 with the amount of fluid carried by the rods 31 being limited by the clearance provided by the openings 6 and 26. The fluid coating on the rods 31 picked up in the receptacle 2 is thus carried by the rods 31 as they move through the opening 26 in the fluid applying members 8 and into the transverse slot 15. However, as the rod members 31 respectively move through the closely fitting openings 28 in the second body portions 18 of the fluid applying members 8, the rod members 31 are wiped by the wall portion 34 of the body portions 18 thereby removing the fluid from the surface of the rods 31. It will now be seen that as the rods 31 continue to move downwardly in the direction shown by the arrow 35 in Fig. 7, the fluid coating 38 of rod member 31 will continue to be carried through the opening 26 in the first body portion 17 and thus, by virtue of being wiped the surface of rod 31 by surface 34 of second body portion 18, the fluid insulation material must flow out of the transverse slot 15. Particular reference to Fig. 7 will now show that if the core member 10 is longitudinally moved with reference to the fluid applying member 8 in the directions respectively shown by the arrows 40 and 41, i.e., the core member 10 being moved away from the receptacle 2, the fluid insulation material flowing out of the transverse slot 15, as at 41, will be applied to the inner wall 42 of winding slot 9 by the surface of the second body portion or distributing head 18 of the fluid applying member 8. It will be recalled that the second body portion 18 was proportioned to provide a clearance 29 with the wall of the slot and it is thus seen that this clearance 29 in essence spreads and applies the insulation material 41 on the wall 42 of the slot thereby to form the coating 43, in a manner quite similar to the application of plaster to a wall.

Referring now more particularly to Figs. 1 through 4, inclusive of the drawings, a core member 10, which is to be integrally insulated and which comprises a plurality of laminations permanently secured together by welding or other means, is supported in cavity 44 of the supporting member 45 which in turn has an actuating rod 46 extending downwardly therefrom. Actuating rod 46 is vertically guided by suitable guide members 47 and 48 and is moved vertically so as to move the core 10 into and out of engagement with the fluid applying members 8 by means of a lever 49 pivoted at 50 to a supporting frame 51. Lever 49 may be manually actuated by means of handle portion 52 or may, in the alternative, be treadle operated by means of a connection 53, the balance of the treadle actuating mechanism being conventional and therefore not further shown. A counterweight 54 to balance the weight of the supporting member 45 and core 10 may be provided at the end 55 of lever member 49.

The upper ends 56 of the rod members 31 are mounted on common mounting member 57 which in turn is provided with a resilient connection to lever 58 by means of a suitable spring 59 and a pair of guide members 60 having slots 61 formed therein in which pins 62 connected to lever 58 are arranged to slide; it will be seen that spring 59 is biased between the rod supporting member 57 and lever 58. Lever member 58 is pivoted as at 64 to frame member 51 and is actuated by means of a link 65 from a suitable actuating means, such as a hydraulic cylinder 65a.

In order to provide the relative motion between the stator 10 and the fluid applying members 8, a spider member 66 is provided secured to the end 67 of a rod 68 extending downwardly through the passageway 7 in the receptacle 2. Spider member 66 has a plurality of finger portions 69 which extend radially outwardly between the fluid applying member 8 so as to engage the upper surface 70 of core member 10. It will thus be seen that downward movement of rod 68 in the direction shown by the arrow 70 will cause fingers 69 on spider member 66 to push core member 10 along with supporting member 45 and supporting rod 46 downwardly against the biasing force inserted by the counterweight 54. Lever 71 on the handle portion 52 of the core supporting member actuating lever 49 is used to latch core supporting member 45 in its lower position against guide member 48, as shown in dotted lines as at 72 during positioning and removal of the core 10 therefrom.

Rod 68 extends upwardly through passageway 7 in receptacle 2 and concentrically within rod members 31 and through suitable openings in rod supporting member 57 and lever 58. Rod 68 further extends upwardly through a suitable clearance opening in a second lever 73, rod 68 having a pair of spaced apart collars 74 and 75 secured thereto between levers 58 and 73, as shown. Lever 73 is pivoted, as at 74, to the supporting frame 51, it being observed that lever 73 has a longer stroke than does the lever 58. A lost motion link 75 connects levers 58 and 73, being pivoted as at 76 to a connecting member 77 adjustably slidable on the lever 58. Lost motion link 75 has a pin 78 which at times engages lever 73 thereby to move it upwardly, as will be hereinafter described, and also a selectively adjustable screw member 79 at times engaging the upper surface of lever 73 thereby to move it downwardly, as will also be hereinafter described. Lever 73 is normally resiliently urged upwardly by means of a suitable spring 80 surrounding rod 81 and engaging member 82 which in turn is secured to the supporting frame 51. Rod 68 and in turn spider member 66 is restrained from a rotation by means of a projection 84 secured to the upper end 85 of rod 68 and extending between a pair of projections 86 (only one being shown), on the end of the pivoted lever 73.

Figure 8:
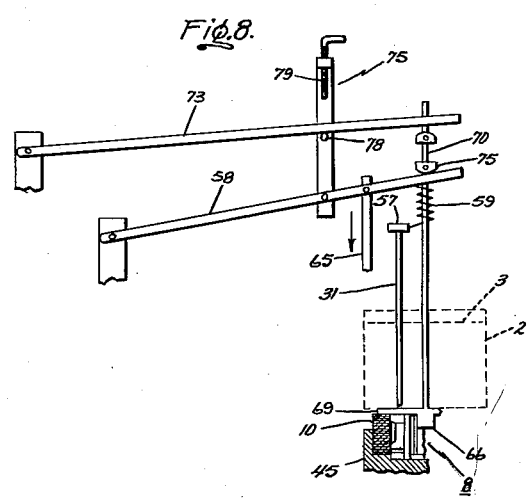
Figs. 8, 9 and 10 are fragmentary schematic views of the apparatus of Fig. 1 shown respectively in three different operative positions.
Figure 9:
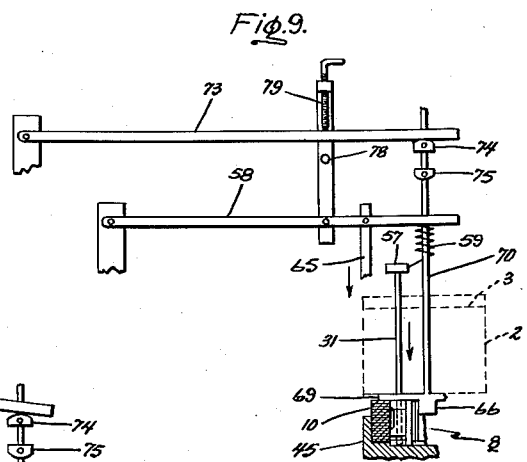
Figure 10:
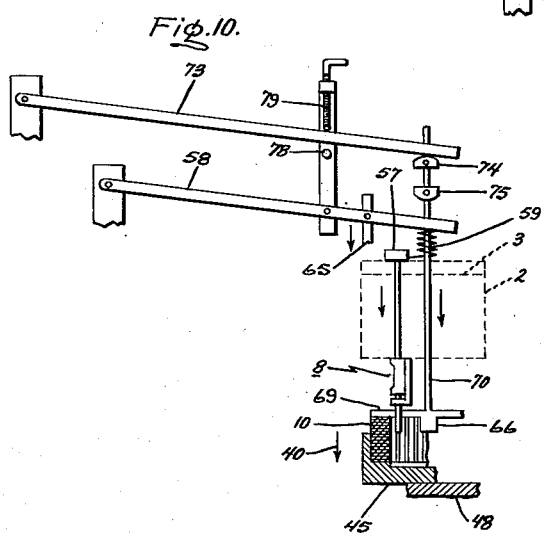

Referring now additionally to Figs. 8, 9 and 10, initiation of an insulation applying operation with my improved apparatus is begun with the levers 73 and 58 in the relative positions shown in Fig. 8 with rods 31 positioned in the receptacle 2, but not extending substantially into openings 26 in the fluid applying members 8. The core 10 which is to have its slots 9 thoroughly insulated is then positioned in supporting member 45 and raised by means of lever 49 and rod 46 until the fluid applying members 8 are completely seated in the slots 9 and the fingers 69 of the spider portion 66 are engaging the upper surface 83 of core 10. In this initial position, it will be seen that lever 58 has engaged collar 75 on rod 68 thereby to move the spider 66 to its initial or most upward position. Hydraulic cylinder 65a is now actuated thereby to move rod 65 downwardly, and in turn to cause lever 58 to pivot downwardly thereby to cause the rods 31 to move through openings 6 in bottom wall 5 of receptacle 2 and openings 26 and 28 in applying members 8, as heretofore described. Referring particularly to Fig. 9, it will be observed that at the point when the rods 31 have been moved just through the openings 26 and 28 in the applying members 8, lever 73 has moved downwardly by virtue of engagement of the adjustable member 79 of link 75 therewith only a sufficient amount just to engage the upper collar 74 on rod 68, but that rod 68 has not moved downwardly and therefore stator member 10 and the support member 45 are still in their initial position. Further downward movement of rod 65 under the influence of hydraulic cylinders 66 thereby moving lever 58 downwardly further to move the rods 31 through the fluid applying members 8 now results in adjustable member 79 moving lever 73 downwardly, lever 73 in turn engaging collar 74 on rod 68 thereby to cause spider member 66 to move core 10 and supporting member 45 away from receptacle 2 so that the fluid applying members 8 effectively move upwardly out of the winding slots 9; it will be seen that the slip fit of portions 27 of fluid applying member 8 accurately position members 8 in slots 10 so that second body portions 18 provide the desired clearance 29. Thus, as described above, the fluid insulation material flowing out of the transverse slots 15 in the fluid applying members 8 is applied to the walls 42 of the slots 10. It will now be observed that by virtue of the shorter stroke of lever 58 with reference to the stroke of lever 73 and the lost motion link connection 75, core member 10 is caused to move away from receptacle 2, thereby causing fluid insulation applying members 8 to move out of the slots simultaneously with the downward motion of the rods 31, but only after a predetermined downward motion of the rods 31, the simultaneous motion, however, being at different rates by virtue of the different strokes of the two levers 58 and 73.

Following completion of an insulation applying operation with the levers 58 and 73 in their positions as shown in Fig. 10, they are then returned to their positions shown in Fig. 8 by reverse actuation of the hydraulic cylinder 66, the core 10 is removed, and another core 10 inserted in the supporting member 45. In the case of the above referred to heat hardenable epoxy resin, the core is then baked for a suitable period, i.e., for example for ½ hour at 150° C., it being understood that the hardening of insulation materials is well known in the art and that this invention is not limited to this particular baking time and temperature. Inspection of the completed core will reveal that not only are the walls of the winding slots 9 completely coated with the epoxy resin, but also the corners of the slots at their junctions with the end walls are also coated. If it is now desired to provide insulation on the ends 83 and 87 of the core 10, heat hardenable epoxy resin can then be sprayed thereon and suitably hardened thereby to form a complete integral insulation system for the stator member.

It will be readily understood that my invention is equally applicable to applying insulation to rotor core members for dynamoelectric machines, as shown at 88 in Fig. 11 and it will be readily seen that the insulation applying members 8 are merely reversed with their narrow portions 11 extending radially outwardly between teeth 89 and 90 which respectively define winding slots 91. It will further be readily apparent that while my invention is particularly applicable to the applying of integral insulation to the core members of dynamoelectric machines, it is also applicable to the applying of a fluid coating to the surface of other articles, for example, it may be employed, with suitable modification as to the arrangement and configuration of the fluid applying members, to the application of integral insulation to transformer cores.

The above described apparatus has been found to provide high quality winding slot insulation in production, the motor so insulated meeting Underwriters Laboratories requirements. The insulation is improved in quality over that previously provided by individually insertable slot insulators, and a saving in the order of 25% is obtained as compared with the cost of the individually insertable insulators.

While I have illustrated and described a specific embodiment of this invention, further modifications and improvements will occur to those skilled in the art and I desire, therefore, in the appended claims to cover all modifications which do not depart from the spirit and scope of this invention.

What I claim as new and desire to secure by Letters Patent of the United States is:

1. Apparatus for applying an insulating coating on the surfaces of a winding slot of a dynamoelectric machine core member, comprising an applicator arranged for insertion into said slot, said applicator including a main body portion having a slip fit with said slot and a spreading distributing head being axially spaced from said main body portion and having a larger predetermined clearance from the walls of said slot corresponding to the desired thickness of coating to be applied to the walls, means for introducing viscous coating material into said slot between said body portion and said spreading distributing head of said applicator, and means for producing relative movement between said applicator and said core member thereby to cause said spreading distributing head to spread said coating material over the walls of said slot in an even layer.

2. Apparatus for applying an insulating coating on the surfaces of a winding slot of a dynamoelectric machine core member, comprising an applicator adapted for insertion into said slot, said applicator including a spreading distributing head having a predetermined clearance from the surfaces of said slot corresponding to the desired thickness of coating to be applied to the wall when said applicator is positioned in said slot, means including a passageway in said applicator for introducing coating material into said slot adjacent said spreading distributing head of said applicator, and means for producing relative movement between said applicator in said core member thereby to cause said spreading distributing head to spread said coating material over the surfaces of said slot in an even layer.

3. Apparatus for applying an insulating coating on a surface of a solid article such as a winding slot for a dynamoelectric machine, said apparatus having an applicator comprising a main body portion having a slip-fit with said slot, a spreading-distributing portion axially spaced from said body portion to form a transverse opening therebetween and radially spaced from the walls of said slot corresponding to the desired thickness of a coating to be applied on the slots walls, a passageway communicating with transverse opening whereby coating material is adapted to be introduced through said passageway into said transverse opening and finally into said slot for coating an even layer of said material on the walls of said slot.

4. For use in applying an insulating coating on the surfaces of a winding slot of a dynamoelectric machine member, a fluid applying member for insertion into said slot, said fluid applying member including a body portion having a slip fit with said slot, a spreading-distributing head disposed adjacent said body portion and having a portion with a predetermined clearance from the walls of said slot corresponding to the desired thickness of a coating to be applied on the slot walls, said body portion having an axially extending passageway therethrough for the introduction of coating material into said winding slot.

5. For use in applying an insulating coating on the surfaces of a winding slot of a dynamoelectric machine member, a fluid applying member for insertion into said slot, said fluid applying member including an elongated body portion having a slip fit with said slot, a spreading-distributing head axially spaced from said body portion forming a transverse opening therebetween, said head having a portion with a predetermined clearance from the walls of said slot corresponding to the desired thickness of a coating to be applied on the slot walls, said body portion having an axially extending passageway therethrough communicating with said transverse opening for the introduction of coating material into said winding slot, and a relatively narrow portion joining said body portion and said spreading-distributing head together and being adapted to extend into the mouth of said slot.

6. Apparatus for applying a fluid coating on a surface of a solid article comprising: a receptacle for said fluid and having an opening therein; a fluid applying member; an elongated rod member adapted to be moved through said receptacle opening; said receptacle opening being larger than said rod member; means for moving said rod member through said receptacle and said receptacle opening whereby a coating of fluid adheres to said rod member and is carried through said opening; said applying member having rod wiping means thereon whereby relative movement of said applying member and said rod member causes removal of said fluid coating therefrom; means for supporting said article adjacent said applying member; and means for providing relative movement between said supporting means and said applying member thereby applying the fluid removed from said rod member to said article surface.

7. Apparatus for applying a fluid coating on a surface of a solid article comprising: a receptacle for said fluid and having an opening therein; a fluid applying member having a body portion with an opening formed therethrough in alignment with said receptacle opening; an elongated rod member adapted to be moved through said receptacle opening; said receptacle and applying member openings being larger than said rod member; means for moving said rod member through said receptacle and said receptacle and applying member openings whereby a coating of fluid adheres to said rod member and is carried through said openings; said applying member having rod wiping means thereon whereby relative movement of said applying member and said rod member causes removal of said fluid coating therefrom; means for supporting said article adjacent said applying member; and means for providing relative movement between said supporting means and said applying member thereby applying the fluid removed from said rod member to said article surface.

8. Apparatus for applying a fluid coating on a surface of a solid article comprising: a receptacle for said fluid and having an opening therein; a fluid applying member having a body portion with an opening formed therethrough in alignment with said receptacle opening; an elongated rod member adapted to be moved through said openings; said receptacle and applying member openings being larger than said rod member; means for moving said rod member through said receptacle and said receptacle and applying member openings whereby a coating of fluid adheres to said rod member and is carried through said openings; said applying member having rod wiping means thereon whereby relative movement of said applying member and said rod member causes removal of said fluid coating therefrom, said applying member having another opening formed therein communicating with said first-named opening and said wiping means and extending to an exterior surface thereof for conducting the fluid removed from said rod to said exterior surface; means for supporting said article adjacent said applying member exterior surface; and means for providing relative movement between said supporting means and said applying member whereby the fluid conducted to said exterior surface of said applying member by said other opening is applied to said article surface.

9. Apparatus for applying a fluid coating on a surface of a solid article comprising: a receptacle for said fluid and having an opening therein; a fluid applying member having a body portion with an opening formed therethrough in alignment with said receptacle opening; an elongated rod member adapted to be moved through said openings; said receptacle and applying member openings being larger than said rod member; means for moving said rod member through said receptacle and said receptacle and applying member openings whereby a coating of fluid adheres to said rod member and is carried through said openings; said applying member having rod wiping means thereon whereby relative movement of said applying member and said rod member causes removal of said fluid coating therefrom, said applying member having another opening formed therein communicating with said first-named opening and said wiping means and extending to an exterior surface thereof for conducting the fluid removed from said rod to said exterior surface; means for supporting said article adjacent said applying member exterior surface; and means operatively connected to said rod moving means for moving said supporting means with respect to said applying member at least in part simultaneously with movement of said rod whereby the fluid conducted to said exterior surface of said applying member by said other opening is applied to said article surface.

10. Apparatus for applying a fluid coating on a surface of a solid article comprising: a receptacle for said fluid and having an opening therein; a fluid applying member having a body portion with an opening formed therethrough in alignment with said receptacle opening; an elongated rod member adapted to be moved through said openings; said receptacle and applying member openings being larger than said rod member; means for moving said rod member through said receptacle and said receptacle and applying member openings whereby a coating of fluid adheres to said rod member and is carried through said openings; said applying member having rod wiping means thereon whereby relative movement of said applying member and said rod member causes removal of said fluid coating therefrom; said applying member having another opening formed therein communicating with said first-named opening and said wiping means and extending to an exterior surface thereof for conducting the fluid removed from said rod to said exterior surface; means for supporting said article adjacent said applying member exterior surface; and means operatively connected to said rod moving means and arranged to move said supporting means with respect to said applying member simultaneously with the movement of said rod after a predetermined initial rod movement whereby the fluid conducted to said exterior surface of said applying member by said other opening is applied to said article surface.

11. Apparatus for applying a fluid coating on a surface of a solid article comprising: a receptacle for said fluid and having an opening formed therein; a fluid applying member having first and second spaced apart body portions, said first body portion having an opening formed therethrough in alignment with said receptacle opening and communicating with the space between said second body portion; an elongated rod member; said receptacle and first body portion opening being larger than said rod member, said second body portion having an opening formed therethrough communicating with said space and closely conforming to said rod; means for moving said rod member through said receptacle and said openings whereby a coating of fluid adheres to said rod member and is carried through said receptacle and first body portion openings into said space, movement of said rod member through said second body portion opening causing said fluid coating to be wiped from said rod member and thereby to flow out of said space; means for supporting said article adjacent said applying member; and means for providing relative movement between said supporting means and said applying member whereby the fluid flowing out of said space is applied to said article surface.

12. Apparatus for applying a fluid coating on a surface of a solid article comprising: a receptacle for said fluid and having an opening formed therein; an elongated fluid applying member having a transverse slot formed inwardly from one surface thereof defining first and second body portions, said first body portion having its end remote from said slot secured to said receptacle and having a longitudinal opening formed therethrough communicating with said receptacle opening and said slot; an elongated rod member; said receptacle and first body portion openings being larger than said rod member, said second body portion having a longitudinal opening formed therethrough communicating with said slot and in alignment with said first body portion opening, said last-named opening closely conforming to said rod member; means for axially moving said rod member through said receptacle and said openings whereby a coating of fluid adheres to said rod member and is carried through said receptacle and first body portion openings into said slot, movement of said rod member through said second body portion opening causing said fluid coating to be wiped from said rod member and thereby to flow out of said slot, means for supporting said article with said surface thereof in close sliding relationship with a surface of said one body portion, a corresponding surface of said second body portion being spaced from said surface of said article surface by a predetermined distance determined by the desired thickness of said fluid coating; and means for moving said supporting means axially in a direction away from said receptacle whereby the fluid flowing out of said slot is applied to said article surface by said second body portion surface.

13. Apparatus for applying an insulation coating on the wall of a winding slot in a core member of a dynamoelectric machine and comprising: a receptacle for said insulation in viscous fluid form and having an opening formed therein; an elongated fluid applying member adapted to be inserted in said winding slot, said applying member having a transverse slot formed in one surface and defining first and second body portions, said first body portion having at least a part proportioned substantially to fill said winding slot, said second body portion being proportioned to provide a clearance with said winding slot wall, said first body portion having a longitudinal opening formed therethrough in alignment with said receptacle opening and communicating with said transverse slot, said second body portion having a longitudinal opening formed therethrough communicating with said transverse slot and in alignment with said first body portion opening; an elongated rod member; said receptacle and first body portion openings being larger than said rod member and said second body portion opening being arranged to provide a close slip fit with said rod member; means for axially moving said rod member through said receptacle and said openings whereby fluid insulation in said receptacle adheres to said rod member forming a coating thereon and is carried through said receptacle and first body portion openings and into said transverse slot, movement of said rod member through said second body portion openings causing said fluid coating to be wiped from said rod member and thereby to flow out of said transverse slot; a member arranged normally to support said core member with said applying member in said winding slot; and means for providing relative axial motion between said supporting member and said applying member whereby the fluid insulation flowing out of said transverse slot is applied to said winding slot wall by said second body portion of said applying member.

14. Apparatus for applying an insulation coating on the wall of a winding slot in a core member of a dynamoelectric machine and comprising: a receptacle for said insulation in viscous form and having an opening formed therein; an elongated fluid applying member adapted to be inserted in said winding slot with a narrow portion extending out of the winding slot opening, said applying member having a transverse slot formed in its surface opposite from said narrow portion and defining first and second body portions, said first body portion having its end opposite from said transverse slot secured to said receptacle and having at least a part proportioned substantially to fill said winding slot, said second body portion being proportioned to provide a clearance with said winding slot wall, said first body portion having a longitudinal opening formed therethrough communicating with said receptacle opening and said transverse slot, said second body portion having a longitudinal opening formed therethrough communicating with said transverse slot and in alignment with said first body portion opening; an elongated rod member sufficiently long to extend through said receptacle and said openings; said receptacle and first body portion openings forming a substantial clearance around said rod member and said second body portion opening being arranged to produce close slip fit with said rod member; means attached to one end of said rod member and positioned on the side of said receptacle remote from said applying member arranged axially to push said rod member for movement through said receptacle and said openings whereby said fluid insulation adheres to said rod member forming a coating thereon and is carried through said receptacle and first body portion openings and into said transverse slot, movement of said rod member through said second body portion opening causing said fluid coating to be wiped from said rod member and thereby to flow out of said transverse slot; a member arranged normally to support said core member with said applying member in said winding slot, said supporting member being axially movable thereby to move said core member so that said applying member moves into and out of said winding slot; a member adapted to engage the exposed surface of said core member when the same is positioned in said supporting member; and a linkage operatively connecting said core engaging member and said rod member pushing means and arranged axially to move said core member and said supporting member away from said receptacle responsive to and at least in part simultaneously with movement of said rod member thereby axially to move said applying member out of said winding slot whereby the fluid insulation flowing out of said transverse slot is applied to said winding slot wall by said second body portion of said applying member.

15. Apparatus for applying an insulation coating on the wall of a winding slot in a core member of a dynamoelectric machine and comprising: a receptacle for said insulation in viscous form and having an opening formed therein; an elongated fluid applying member adapted to be inserted in said winding slot with a narrow portion extending out of the winding slot opening, said applying member having a transverse slot formed in its surface opposite from said narrow portion and defining first and second body portions, said first body portion having its end opposite from said transverse slot secured to said receptacle and having at least a part proportioned substantially to fill said winding slot, said second body portion being proportioned to provide a clearance with said winding slot wall, said first body portion having a longitudinal opening formed therethrough communicating with said receptacle opening and said transverse slot, said second body portion having a longitudinal opening formed therethrough communicating with said transverse slot and in alignment with said first body portion opening; an elongated rod member sufficiently long to extend through said receptacle and said openings; said receptacle and first body portion openings forming a substantial clearance around said rod member and said second body portion opening being arranged to provide a close slip fit with said rod member; means attached to one end of said rod member and positioned on the side of said receptacle remote from said applying member arranged axially to push said rod member for movement through said receptacle and said openings whereby said fluid insulation adheres to said rod member forming a coating thereon and is carried through said receptacle and first body portion openings and into said transverse slot, movement of said rod member through said second body portion causing said fluid coating to be wiped from said rod member and thereby to flow out of said transverse slot; a member arranged normally to support said core member with said applying member in said winding slot, said supporting member being axially movable thereby to move said core member so that said applying member moves into and out of said winding slot; a member adapted to engage the exposed surface of said core member when the same is positioned in said supporting member; said receptacle having a longitudinal passage extending therethrough; another rod member extending through said receptacle passage and having one end secured to said core member engaging member; and a lost motion linkage operatively connecting the other end of said other rod member and said rod member pushing means and arranged axially to move said core member and said supporting member away from said receptacle after a predetermined movement of said first-named rod member and thereafter to move said core member and supporting members simultaneously with said first-named rod member thereby axially to move said applying member out of said winding slot whereby the fluid insulation flowing out of said transverse slot is applied to said winding slot wall by said second body portion of said applying member.

16. Apparatus for applying an insulation coating on the wall of a winding slot in a core member of a dynamoelectric machine and comprising: a receptacle for said insulation in viscous form and having an opening formed therein; an elongated fluid applying member adapted to be inserted in said winding slot with a narrow portion extending out of the winding slot opening, said applying member having a transverse slot formed in its surface opposite from said narrow portion and defining first and second body portions, said first body portion having its end opposite from said transverse slot secured to said receptacle and having at least a part proportioned substantially to fill said winding slot, said second body portion being proportioned to provide a clearance with said winding slot wall, said first body portion having a longitudinal opening formed therethrough communicating with said receptacle opening and said transverse slot, said second body portion having a longitudinal opening formed therethrough communicating with said transverse slot and in alignment with said first body portion opening; an elongated rod member sufficiently long to extend through said receptacle and said openings; said receptacle and first body portion openings forming a substantial clearance around said rod member and said second body portion opening being arranged to provide a close slip fit with said rod member; said rod member being normally positioned in said receptacle with one end thereof extending out of said receptacle on the side thereof remote from said applying member; a supporting frame for said receptacle; a lever member pivotally mounted on said frame and operatively connected to said one end of said rod member; means operatively connected to actuate said lever member thereby axially to push said rod member so that the other end thereof moves through said receptacle and applying member openings whereby said fluid insulation in said receptacle adheres to said rod member forming a coating thereon and is carried through said receptacle and first body portion openings and into said transverse slot, movement of said rod member through said second body portion opening causing said fluid coating to be wiped from said rod member and thereby to flow out of said transverse slot; a member arranged normally to support said core member with said applying member in said winding slot, said supporting member being axially movable thereby to move said core member so that said applying member moves into and out of said winding slot; a member adapted to engage the exposed surface of said core member when the same is positioned in said supporting member; said receptacle having a longitudinal passage extending therethrough; another rod member extending through said receptacle passage and having one end secured to said core member engaging member; another lever member pivotally mounted on said frame and having a longer stroke than said first-named lever member, said other lever member being operatively connected to the other end of said other rod member; and a lost motion link interconnecting said lever members whereby said other lever member axially moves said other rod member thereby to move said core member and said supporting member away from said receptacle after a predetermined movement of said first-named lever member and rod member and thereafter to move said core member and supporting member simultaneously with said first-named rod member thereby axially to move said applying member out of said winding slot whereby the fluid insulation flowing out of said transverse slot is applied to said winding slot wall by said second body portion of said applying member.

References Cited in the file of this patent

UNITED STATES PATENTS

| 1,716,384 | Pettee | June 11, 1929 |
| 2,017,042 | Dougherty | Oct. 15, 1935 |
| 2,348,233 | Turnock et al. | May 9, 1944 |

FOREIGN PATENTS

| 500,687 | Germany | June 24, 1930 |